United States Patent

Thompson

[11] Patent Number: 5,273,466
[45] Date of Patent: Dec. 28, 1993

[54] NAUTICAL TANK VENT

[76] Inventor: David M. Thompson, 802 Mantoloking Rd., Brick Town, N.J. 08723

[21] Appl. No.: 863,778

[22] Filed: Apr. 6, 1992

[51] Int. Cl.$^5$ ............................................. B65D 25/02
[52] U.S. Cl. .................... 440/88; 137/587; 220/DIG. 27
[58] Field of Search ............... 114/211; 440/88, 89; 220/369, 370, 371, 372, DIG. 27; 137/351, 587, 588

[56] References Cited

U.S. PATENT DOCUMENTS

| | | | |
|---|---|---|---|
| 1,992,151 | 2/1935 | Woodbridge | 220/DIG. 27 |
| 3,924,773 | 12/1975 | Wilkinson | 137/587 |
| 4,091,956 | 5/1978 | Vecchio | 220/369 |
| 4,706,840 | 11/1987 | Thompson | 220/DIG. 27 |
| 4,825,405 | 5/1989 | Whitley | 440/88 |
| 4,995,433 | 2/1991 | Beicht et al. | 137/587 |
| 5,088,947 | 2/1992 | Whitley et al. | 440/88 |

Primary Examiner—Galen Barefoot
Assistant Examiner—Stephen P. Aviva
Attorney, Agent, or Firm—Charles F. Gunderson

[57] ABSTRACT

A tubular vent device extends through a hole in the hull of a boat, well above the water line. The outer portion of the vent device has a circular ridge or shoulder larger than the hole through the hull to hold the outer portion outside of the hull. The inner portion is threaded to accomodate an inner nut with a collar or washer larger than the hole to let the nut draw the inner collar and outer shoulder tight against their opposing sides of the hull. The inner portion terminates in a coupling for a hose to connect to a tank to be vented. The outer portion of the vent, beyond the shoulder, is also threaded to receive a cap that has a series of fine, axial slots through its outer surface for ventilation. The end of the outer portion of the vent also has a tapered conical portion within the cap, with a pair of axial ridges on the outside just above a pair of axial ventilating slots that open the tubular vent to the fine slots in the cap. These fine slots in the cap provide ventilation with a minimum of exposure to rain, spray, insects, and foreign matter; and the inner, tapered, conical portion, with its axial ridges, provides ventilation while keeping water out of the inner tubular vent device and the tank.

4 Claims, 1 Drawing Sheet

NAUTICAL TANK VENT

BACKGROUND OF THE INVENTION

Almost every tank containing liquids needs a vent of some sort to allow gasses to escape as liquids are added to the tank, or air to re-enter to replace liquids being drawn out of the tank; as well as to allow the escape of volatile gasses or fumes. On a boat, and particularly in regard to gasoline tanks, where the vapors are explosive, these vents must be outside of the hull. This poses special problems, since any vent to the outside of the hull must be exposed to the elements of the weather, and especially to rain and spray, which, if either were to enter the vent, could be quite damaging to the fuel—and ultimately the engine—or could contaminate whatever is in the tank. It is also important to provide screening to keep out insects and other foreign matter.

This invention is an improvement over my earlier device covered in U.S. Pat. No. 4,706,840, dated Nov. 17, 1987, for a "Baffled Tank Vent". This and other typical tank vents, with or without valves, will perform similar functions but with similar problems. A one-way valve could prevent most contaminants from getting in, but it could also block the flow of air into the tank, which would inhibit one of the functions of the vent, and could be critical.

The vent should not be unattractive, and it must not project too far from the outside of the hull to become vulnerable to breakage or other physical damage. It must be strong enough to stand occasional physical abuse, and should be easily removable for cleaning, repair, or replacement. It must also have a screening effect to keep bugs, that would not be good for the fuel or the engine, out of the tank.

It is therefore an object of this invention to provide a vent that extends through the side of a hull in a simple and secure manner, but also includes an unique combination of baffles to provide protection against rain, spray, and insects.

SUMMARY OF THE INVENTION

An assembly for venting a container, such as a gasoline or other tank, where fumes or liquid volume changes require venting to the atmosphere, has a feed-through tube extending through the hull, well above the water line. A collar, shoulder, or gasket near the outer portion of the tube seats against the outside of the hull. The inner portion of the tube is threaded to accomodate a nut that screws onto the inner projection of the threaded tube with a collar or gasket to seat against the inside of the hull. This nut draws the outer vent shoulder tightly against the outside of the hull, and the inner collar tightly against the inside of the hull. The inner end of the feed-through tube may be coupled to any tank by means of a standard hose.

The outside portion of the tube, beyond the shoulder, ends in a cone-shaped portion with slots for ventilation below baffles to deflect water. The outer portion, adjacent to the shoulder, is threaded to accomodate a threaded cap that seats tightly against the outside of the shoulder, but is spaced from the outside of the cone-shaped portion, for additional ventilation. The outside of the outer part of the cap is slotted to provide the final stages of ventilation from the slotted cone.

DETAILED DESCRIPTION OF THE DRAWINGS

Figure 1:
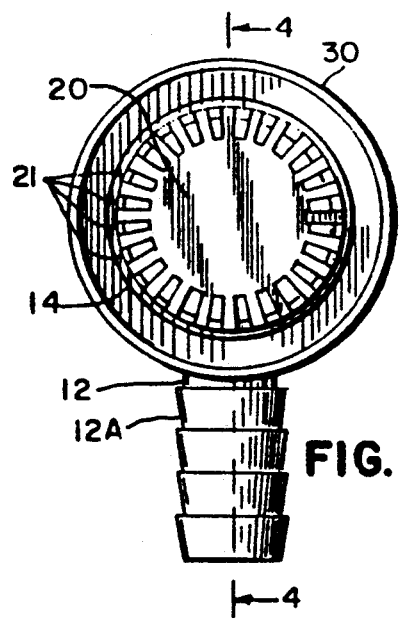
FIG. 1 is a front view of the device.

FIG. 1 is a front view of the basic vent device from the outside, not mounted in a hull. Here one sees the nut collar, or washer 30 that fits against the inside of the hull, not shown. A cap 20 is also seen with its vent slots 21. A shoulder 14, that fits against the outside of the hull, is also seen. The inner end of the tubular device 12 is seen behind the collar 30. The gripping portion 12A has ridges to hold and seal a vent tube, not shown, that connects to a gas tank, or the like. These elements, and their functions will be more clearly seen and shown in the following drawings, in which all similar elements are similarly numbered.

Figure 2:
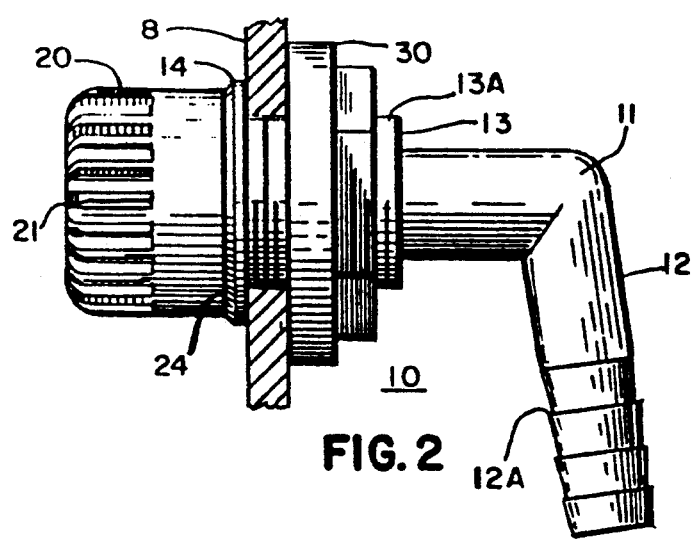
FIG. 2 is a side view of the device of FIG. 1.

FIG. 2 shows a side view of the device of FIG. 1, extending through a hull 8, shown in cross section just within the device 10. This more clearly shows the inner portion of the vent 11, with its inner end 12 including a gripping portion 12A to hold and seal the tube, not shown, that will be connected to a tank, not shown.

The inner end joins, or is part of, the inner, hull portion 13, which is threaded along 13A to accomodate a nut 31, that may be part of the collar 30 that rests against the inside of the hull 8. Another collar, shoulder, or flange, 14, that may also be a part of the vent body, rests against the outside of the hull 8. The cap 20, with its vent slots 21, has its base 24 secured against the shoulder 14, as will be more clearly shown in the subsequent figures.

Figure 3:
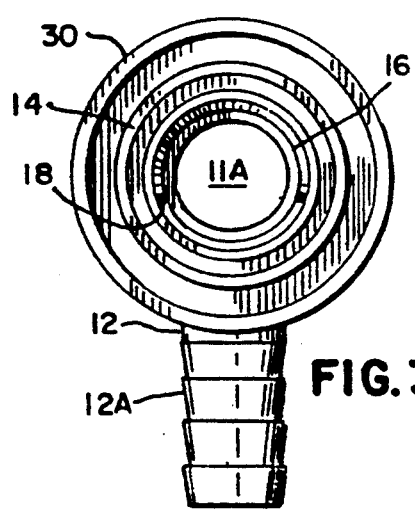
FIG. 3 is a front view of the device of FIGS. 1 and 2 with the cap removed.

FIG. 3 shows a front view of the vent body of FIG. 1 without the cap 20. The outer rim of the collar 30, and the shoulder 14 are again seen, but here a tapered outer end or cone portion 16 is seen projecting from a vent duct 11A. Also, inner breather slots, such as 18, are seen on either side of the tapered outer end. These and their function will, again, be more clearly shown in the following figures.

Figure 4:
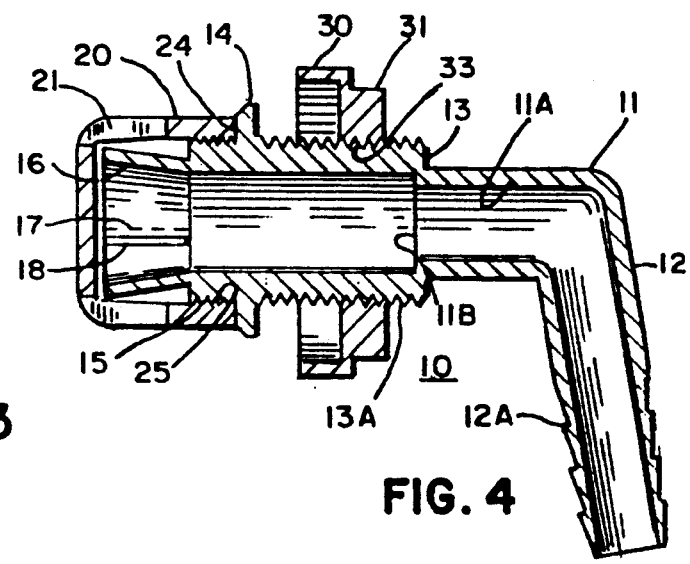
FIG. 4 is a cross section of a side view of the device of FIG. 2 through the lines 4—4 of FIG. 3.

FIG. 4 shows a side view, in cross section of the vent body of FIG. 2, through the lines 4—4 of FIG. 1, with the cap 20, but without the hull section. This shows more clearly the vent passages from 12A to the outer slots 21, as well as the structure necessary to provide a secure and effective vent device. This also shows, more clearly, the inner, input end 12 of the vent, forming a duct 11A, joining the slightly larger hull portion 13 along the ridge 11B. The hull portion 13 is threaded along 13A. This accomodates the threaded nut 31 with its collar or flange 30 to be tightened against the inside of the hull. This nut and its flange opposes the shoulder 14 on the outside of the hull, and combine to secure the vent, and seal it. This figure also shows, more clearly, in its cross section, the tapered outer end 16 of the vent body, with a baffle ridge 17—in dashed lines—and one of the inner vent slots 18.

This figure also shows the cap 20 in cross section, with one of its outer slots 21 through the outer casing, and its cap base 24 turned tightly against the outer side of the shoulder 14, by the threaded inner portion 25 of the cap engaging the outer threads 15 of the vent body. The ventilating space between the tapered outer end and the inside of the cap is also shown here.

Figure 5:
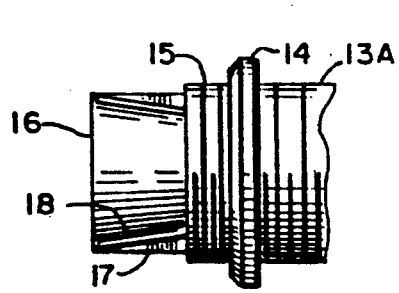
FIG. 5 is a top view of the outer portion of the device of FIG. 4, without the cap.

FIG. 5 is a top view of the outer portion of the vent body without the cap or the inner hull portion. This shows, again, a part of the threaded portion 13A that extends through the hull to join the shoulder 14, and the outer threaded portion 15 joining the tapered outer end 16. This also shows the baffle ridges, such as 17 on either side above the inner vent shots 18.

Figure 6:
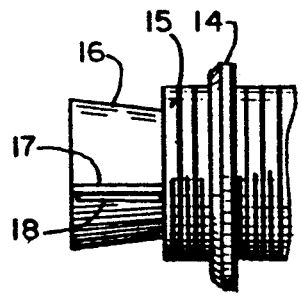
FIG. 6 is a side view of the same.

FIG. 6 is a side view of the portion of the vent body of FIG. 5, with the same elements similarly numbered. This shows, clearly, a baffle ridge 17 above an inner vent slot 18.

In operation, a hole is drilled through the hull, well above the water line, of course, just large enough to pass the inner end and the inner threaded portion of the vent body. However, the hole must be small enough—and the shoulder 14 large enough—that the shoulder will seat tightly against the outer surface of the hull, and not pass through the hull. The nut 31 is then passed over the inner end of the vent body, with its collar 30 facing the inner side of the hull. The threaded nut engages the threads 13A and is tightened to draw the outer shoulder 14 tightly against the outer surface of the hull, and the collar 30 tightly against the inner surface of the hull. This is seen in FIG. 2, and secures the vent through the hull, and seals it.

The inner end 12 and 12A, of the vent body, seen in FIGS. 1 through 4, is designed to accomodate a rubber hose, or the like, not shown, to extend down to any tank or container to be vented. This is intended to allow noxious or combustible fumes to be expelled from the tank outside of the boat when the tank is being filled, and to allow fresh air to be drawn into the tank, without rain, spray, insects, or other contaminants, as the fuel is being used. Obviously, the hose must fit tightly over the gripping portions 12A, and may be clamped as well, to avoid its being disconnected under any predictable kind of stress, and, equally obviously, the other end of the hose must be tightly connected to and sealed to the tank.

The cap, shown in FIGS. 1 and 2, and in cross section in FIG. 4, is removable for cleaning, testing of the vent ducts, or replacement. Its outer vent slots must be of sufficient size to accomodate the predictable flow of gases through the vent duct and inner vent slots, but they must be as narrow as practical to act as a screen against the entry of tiny bugs, or foreign particles or any appreciable size. While a certain amount of rain or spray may enter the outer vent slots, the taper of the outer end, and the baffle ridges, will direct such rain or spray away from the opening of the outer end and inner vent slots to drain out of the bottom outer vent slots. The ridge 11B at the junction of the duct 11A and the hull portion 13 will further block liquids from entering the duct 11.

The orientation of the breather openings and gaps provide a minimal, but adequate flow of air to ventilate and control the pressure of air within the tank, and provide protection against almost anything except full immersion. As noted, the layout of the openings precludes water entry from rain or spray, and even some wave action.

Also, as noted earlier, the sizes of the collar 30 and the shoulder 14 may be varied to provide more or less strength to the vent mount. The collar 30 may be replaced by a washer or resilient gasket for a better seal against the inside of the hull. Similarly, an additional washer, and/or resilient gasket, may also be fitted between the shoulder 14 and the outside of the hull.

The size and shape of the overall vent body may be varied to accomodate the size of the boat and the tank to be vented. Other variations in the various elements will be obvious to one skilled in the art, and are also within the teachings and concept of this invention.

The hose coupling end of the feed-through tube may be at the angle shown in these drawings, which would provide minimum projection into the inner hull, and be less vulnerable to damage or breakage of the connecting hose, which could be critical. On the other hand it could extend straight within the hull if this were mechanically or practically desirable. The basic concept of the vent would be the same.

The size of the inner and outer vent slots, as well as the sizes of the outer and inner tubes controls the amount of air flow, which would normally be minimal for a small tank. The vent slots also, inherently, function as a screen, as noted, and should be narrow enough to keep out any and all possible bugs.

All of the major elements of this device are removable, for cleaning or replacement, which could be very handy in the event of clogging of any kind.

Claim:

1. A vent, having an outer portion and and inner portion, extending through a hull, to be connected to a tank within said hull; said inner portion comprising a continuously-threaded tubular unit extending through a hole in said hull well above the waterline; a circular shoulder, separating said outer portion from said inner portion, positioned near the outer end of said tubular unit to seat against the outside of said hull; means positioned at the inner end of said tubular unit for connecting said tubular unit to said tank within said hull; a circular cap having a threaded, open, inner portion, a solid outer portion, and a series of axial venting slots through said outer portion of said cap; said outer portion of said vent having a threaded section, outside of said circular shoulder, to accomodate said threaded inner portion of said cap, that screws tightly against the outside of said shoulder; said outer portion of said vent ending in an outwardly tapered section spaced from said solid outer portion of said circular cap for additional ventilation; said tapered section also having axial venting slots through said tapered section, and ridges above said slots to deflect any fluids away from said slots; and a nut to engage the threads of the inner end of said tubular unit to seat against the inside of said hull, and draw said nut and said circular shoulder tightly against the corresponding sides of said hull, said axial slots through said cap venting gases in and out of said slots in said tapered section to provide a vent for said tank.

2. A vent, extending through a hull, as in claim 1, wherein said nut has a resilient flange adjacent to said inside of said hull, to conform to the contours of said inside of said hull, and form a tight seal.

3. A vent, extending through a hull, as in claim 1, wherein said means for connecting said inner end of said tubular unit to said tank within said hull includes a rigid tubular section to accomodate a flexible hose.

4. A vent, extending through a hull, as in claim 3, wherein said means for connecting said inner end of said tubular unit to said tank within said hull comprises a flexible tube having one end coupled to said inner end of said tubular unit, and another end coupled to said tank within said hull.

* * * * *